United States Patent
Larson et al.

(10) Patent No.: US 6,430,661 B1
(45) Date of Patent: Aug. 6, 2002

(54) METHOD AND APPARATUS FOR ACCESSING VARIABLE SIZED DATA WITH PRIORITIZATION

(75) Inventors: David N. Larson, Austin; Dennis A. Shumaker, Allen, both of TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/340,579

(22) Filed: Jun. 28, 1999

(51) Int. Cl.[7] .......................... G06F 12/00; G06F 13/18
(52) U.S. Cl. .................. 711/158; 711/170; 711/171
(58) Field of Search ................ 711/170, 171, 711/172, 173, 158, 154

(56) References Cited

U.S. PATENT DOCUMENTS

| | | | | |
|---|---|---|---|---|
| 5,375,089 A | * | 12/1994 | Lo .......................... | 365/189.04 |
| 5,463,591 A | * | 10/1995 | Animoto et al. ........ | 365/230.05 |
| 5,488,631 A | * | 1/1996 | Gold et al. .................. | 375/206 |
| 5,535,172 A | * | 7/1996 | Reddy et al. .......... | 365/230.03 |
| 5,659,596 A | * | 8/1997 | Dunn ........................ | 455/456 |
| 5,745,708 A | * | 4/1998 | Weppler et al. ............ | 710/119 |
| 6,047,356 A | * | 4/2000 | Anderson et al. .......... | 711/129 |
| 6,067,608 A | * | 5/2000 | Perry ........................ | 711/203 |
| 6,088,777 A | * | 7/2000 | Sorber ....................... | 711/171 |
| 6,237,079 B1 | * | 5/2001 | Stoney ........................ | 712/34 |

* cited by examiner

Primary Examiner—Tuan V. Thai
(74) Attorney, Agent, or Firm—Williams, Morgan & Amerson

(57) ABSTRACT

A method and apparatus are provided, where method includes defining a first portion of a memory for receiving data and providing a memory request to transfer data from a source to the first portion of the memory defined to receive the data. The method further includes transferring a portion of data from the source to the first portion of the memory according to a priority scheme that determines the sequence of the data transfer, wherein the size of the portion of the data substantially corresponds to the size of the first portion of the memory.

22 Claims, 12 Drawing Sheets

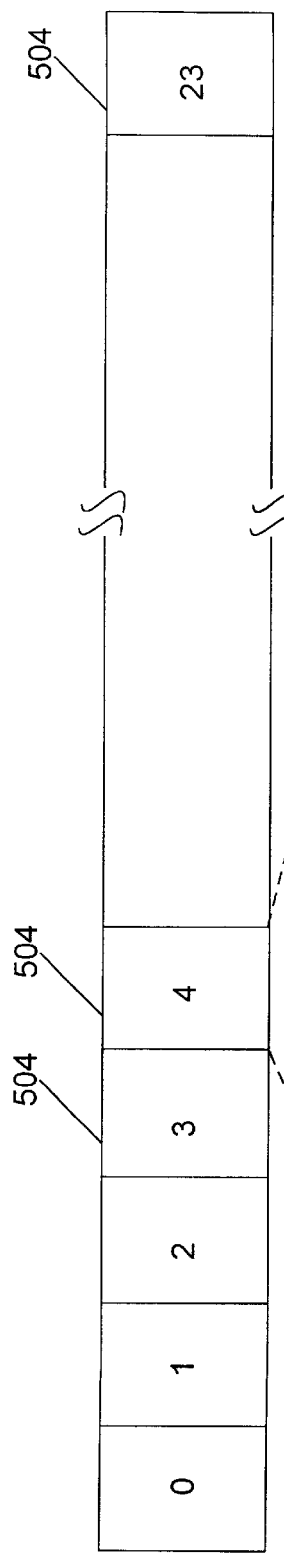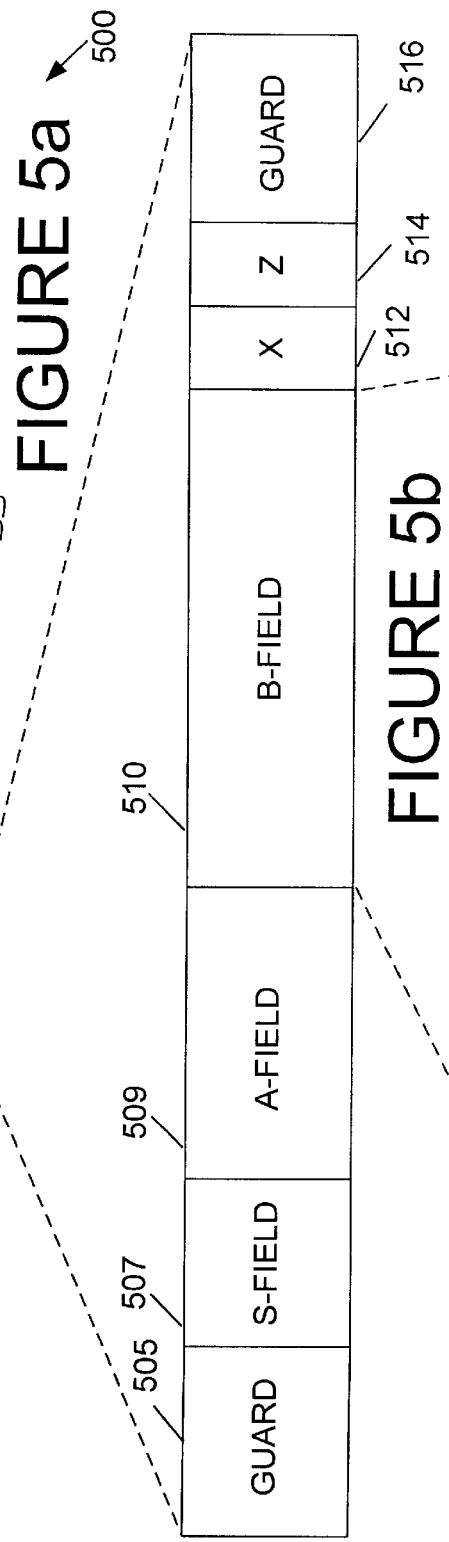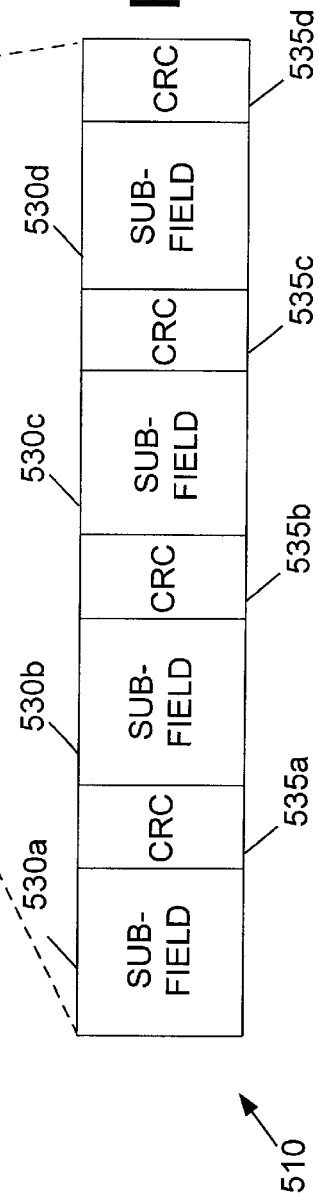
FIGURE 5a
FIGURE 5b
FIGURE 5c

| SLOT # | PACKET DATA ACTIVE | CARRIER TYPE | PACKET DATA BUFFER |
|---|---|---|---|
| SLOT 0 | | | |
| SLOT 1 | | | |
| SLOT 2 | | | |
| SLOT 3 | | | |
| SLOT 4 | | | |
| ... | ... | ... | ... |
| SLOT 21 | | | |
| SLOT 22 | | | |
| SLOT 23 | | | |

| FRAME PORTION | LBNS | SLOT NUMBER |
|---|---|---|
| FIRST HALF OF THE FRAME | LBN1 | |
| | LBN2 | |
| | LBN3 | |
| | ••• | |
| | LBN13 | |
| | LBN14 | |
| SECOND HALF OF THE FRAME | LBN1 | |
| | LBN2 | |
| | LBN3 | |
| | ••• | |
| | LBN13 | |
| | LBN14 | |

METHOD AND APPARATUS FOR ACCESSING VARIABLE SIZED DATA WITH PRIORITIZATION

BACKGROUND OF THE INVENTION

1. Field of the Invention

This invention relates generally to accessing data, and, more particularly, to accessing variable sized blocks of data with prioritization.

2. Description of the Related Art

Modern day electronic products, such as computers and telecommunications devices, are generally faster and more efficient than their predecessors. Two important factors that have contributed to the improved performance of today's electronic products is the efficiency and faster rate at which these products transmit and receive signals. However, given the customer demand for faster and more responsive products, designers are constantly seeking ways to achieve a higher bandwidth while controlling the costs.

The overall performance of applications, particularly real-time telecommunication applications, can be improved by increasing the bandwidth available for transmitting signals. One example of a real-time telecommunication application where an increased bandwidth is desirable is a Wireless Local Loop (WLL) network.

Wireless Local Loop is quickly emerging as the technology that promises to deliver telephone service in geographical areas where using conventional copper telephone lines is cost prohibitive, or in a case where a telephone line exists, radio access technologies such as WLL provide other companies an opportunity to provide competitive services. Installing the last quarter of a mile of the telephone wire to a subscriber station is usually one of the most costly portions of the traditional telephone network, primarily because of the expenses associated with labor and maintenance. The telephone companies, which are usually responsible for maintaining the telephone wire, are frequently plagued with the daunting task of repairing the damage to the telephone lines caused by inclement weather, falling trees, digging, and by the recurring problem of copper wire theft. Accordingly, to circumvent the problems that are typically associated with the "traditional" telephone network, system designers turned to WLL technology, which is proving to be a promising and viable alternative.

FIG. 1 illustrates a block diagram of a WLL network 100. The WLL network 100 includes a Wireless Subscriber Unit (WSU) at a subscriber station 115 that communicates with a remote Basestation Transceiver System (BTS) 120. The data flow from the WSU 110 to the BTS 120 is referred to as an uplink connection, and the data flow from the BTS 120 to the WSU 110 is referred to as a downlink connection. The BTS 120 links the WSU 110 to a central office 130, thus allowing a user at the subscriber station 115 to communicate with other subscriber stations (not shown) through the central office 130. A connection 132 between the BTS 120 and the central office 130 may be made via a wire-line, fiber or microwave link, depending on the bandwidth, distance, and the terrain.

The heart of the WLL network 100 is the "wireless" interface between the BTS 120 and the WSU 110, where the need for the copper loop is eliminated. The WSU 110, located in the home or office, provides a radio frequency (RF) interface to an existing phone 135 or modem 140, usually through an RJ-11 type plug (not shown). The connection between the subscriber station 115 and the central office 130 is typically as reliable and clear as the copper wire version.

The counterpart to the WSU 110 is the BTS 120, which is generally located in the field. As is common in most wireless systems, the BTS 120 serves as a control station for the WSU 110 by providing, over a designated pilot channel, synchronization and control information necessary to initiate and maintain two-way communication. In communication systems employing time division multiple access (TDMA), a process well known in the art, the WSU 110 selects the channel frequency and the specific time slot based upon the availability and quality of the channels in the coverage area.

Most wireless communication systems, including the WLL network 100, operate in accordance with industry defined standards. For example, two popular standards for the WLL network 100 are Personal Handyphone System (PHS) and Digital Enhanced Cordless Telecommunications (DECT). The PHS and DECT standards, as well as other WLL standards, define the format for transmitting and receiving data, error checking algorithm, retransmission scheme, and other such parameters that are relevant to wireless communications systems.

The DECT standard for the WLL network 100, for example, defines a 10-millisecond TDMA frame that comprises twenty-four time slots, where generally twelve slots are reserved for transmitting and twelve for receiving. DECT supports voice, analog data, and packet data communications. Voice and analog data communications are full duplex, whereas packet data communications are simplex in nature. Packet data communications can take advantage of directing all slots in one direction, uplink or downlink, with the exception of one slot for the reverse acknowledgement channel. Depending upon the bandwidth allocated by the system, an uplink or downlink channel can utilize between one and twenty-three lots for transferring packet data. When no data is waiting to be sent, the bandwidth is deallocated and assigned to other users. Thus, in an uplink connection, the BTS 120 of the WLL network 100 can transmit data on up to twenty-three slots that are allocated for transmitting data per each frame to the WSU 110. Assuming all of the data is successfully transmitted over the twenty-three time slots, then new data may be transmitted on the twenty-three transmit time slots of the next frame. On the other hand, if not all of the data is successfully transmitted to the BTS 120 because of transmission errors, then that data is retransmitted over the twenty-three transmit time slots in accordance with the DECT retransmission scheme.

The retransmission scheme of a DECT WLL network requires an acknowledgement to be generated by the peer station on a slot-by-slot basis for duplex bearers. Double simplex bearers' acknowledgements are on a logical bearer number (LBN) basis contained in a MAC-MOD-2ACK message in a reverse bearer. The BTS 120 or the WSU 110 may be the peer station, depending on whether the connection is an uplink or downlink connection. That is, in an uplink connection, the BTS 120 is the peer station, and in a downlink connection, the WSU 110 is the peer station. A "good" acknowledgement, a request to advance, from the peer device indicates a good transmission and new data should be transmitted in the next frame. On the other hand, a "bad" acknowledgement, a request to retransmit, indicates a bad transmission, and thus requires retransmission of data that was not received correctly by the peer station.

Generally, in the WSU 110 or the BTS 120 of the WLL network 100, data is retrieved from an external source (not shown), such as a processor or memory, before the data is transferred to the peer station. Because the data is transmitted and received at a fast rate between the BTS 120 and the WSU 110, it is desirable to quickly access the data for transmission from the external source (not shown). However, because the data carried by some slots may not successfully reach the BTS 120 during the first attempt, it may be necessary to retransmit unacknowledged slots until the data successfully reaches the BTS 120. Accordingly, some retransmission schemes may require different sized blocks of data to be retrieved from the external source for each frame transmission. Thus, the amount of data that is retrieved for transmission of the next frame may depend on the successful transmission rate of the previous frame since new data is generally retrieved for only those slots for which the transmission successfully completes.

The conventional method of retrieving data entails having a microprocessor or a microcontroller (not shown) program or instruct a direct memory access controller (not shown) to fetch the desired data. To retrieve different sized blocks of data for each transmission, the microprocessor/ microcontroller, using the conventional method, must reprogram the direct memory access controller for each memory access. Reprogramming the direct memory access controller to fetch different sized blocks of data for each memory access, however, is a time-consuming process that can adversely affect the performance of the communications system. Additionally, the order in which data is retrieved from the external source may also adversely affect the performance of the communications system, as these communications systems transmit and receive data at high speeds in successive frames. It is therefore desirable that the data to be transmitted during a particular frame be readily available to the communications system before the transfer of that frame.

Another problem is that data may have to be transferred to non-contiguous memory locations making, the use of a discretionary access controller less efficient. Additionally, data transfer must also occur in a timely manner, in which case the microprocessor has to respond to an interrupt with low latency and manage real time data transfer.

The present invention is directed to overcoming, or at least reducing the effects of, one or more of the problems set forth above.

SUMMARY OF THE INVENTION

In one aspect of the present invention, a method is provided. The method includes defining a first portion of a memory for receiving data and providing a memory request to transfer data from a source to the first portion of the memory defined to receive the data. The method further includes transferring a portion of data from the source to the first portion of the memory according to a priority scheme that determines the sequence of the data transfer, wherein the size of the portion of the data substantially corresponds to the size of the first portion of the memory.

In another aspect of the present invention, an apparatus is provided. The apparatus includes a source for providing data, and a memory having a first portion configured to receive the data from the source. The apparatus comprises an access controller that is capable of transferring data from the source to the first portion of the memory in response to a memory request. The apparatus includes a control logic capable of providing the memory access request to the access controller to transfer a portion of the data from the source that corresponds to the size of the first portion of the memory in accordance with a priority scheme that determines the sequence of the data transfer.

BRIEF DESCRIPTION OF THE DRAWINGS

The invention may he understood by reference to the following description taken in conjunction with the accompanying drawings, in which like reference numerals identify like elements, and in which:

FIGS. 5*a–c* illustrate a DECT frame that may be utilized for transmitting packet data in accordance with the present invention.

FIG. 8 depicts an embodiment of a slot to buffer link table that may be utilized by the Wireless Subscriber Unit of FIG. 6.

FIG. 9 depicts an embodiment of a logical bearer number (LBN) to slot link table that may be utilized by the Wireless Subscriber Unit of FIG. 6;

Figure 1:
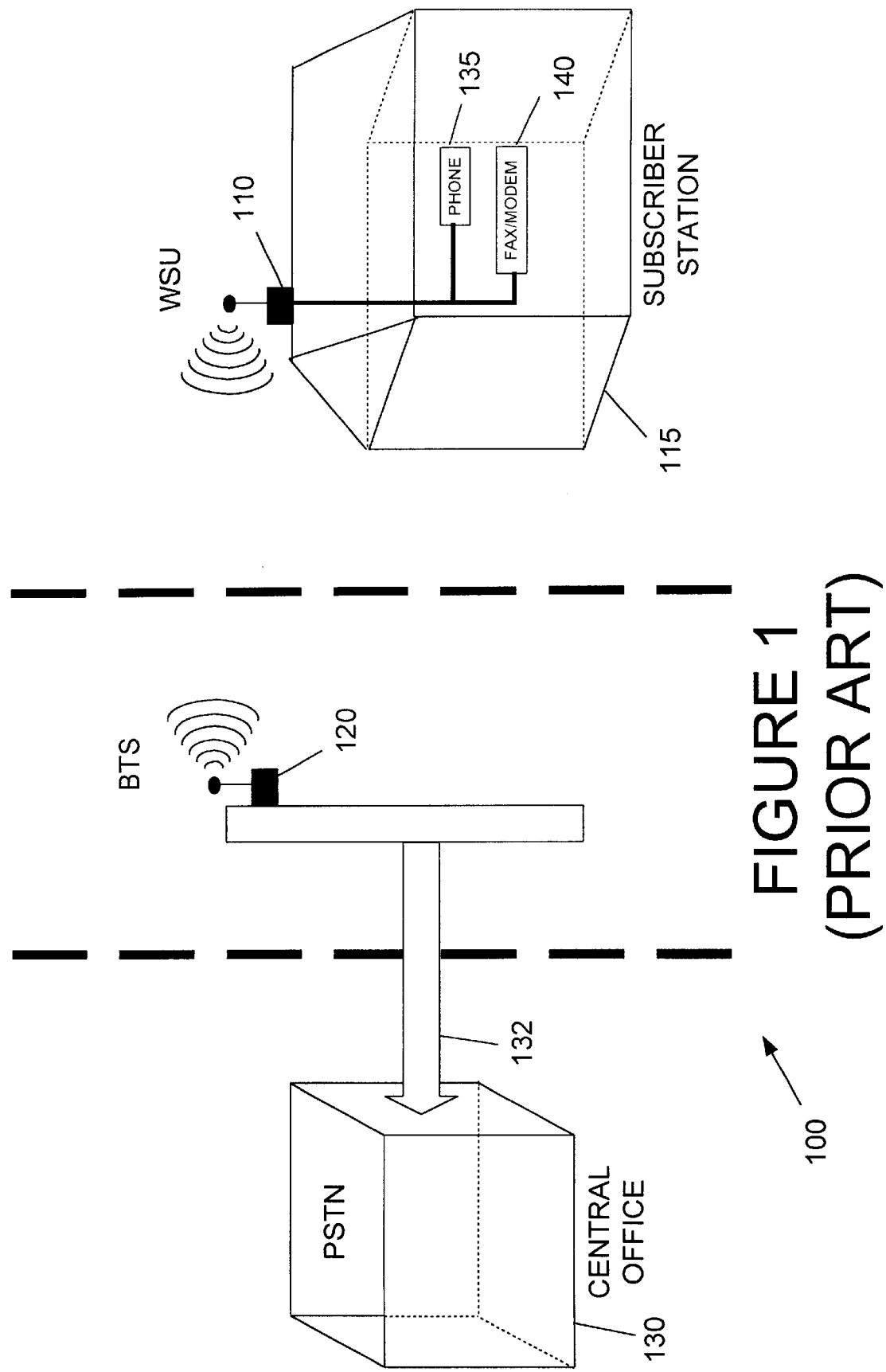
FIG. 1 is a prior art illustration of a stylized block diagram of a WLL network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
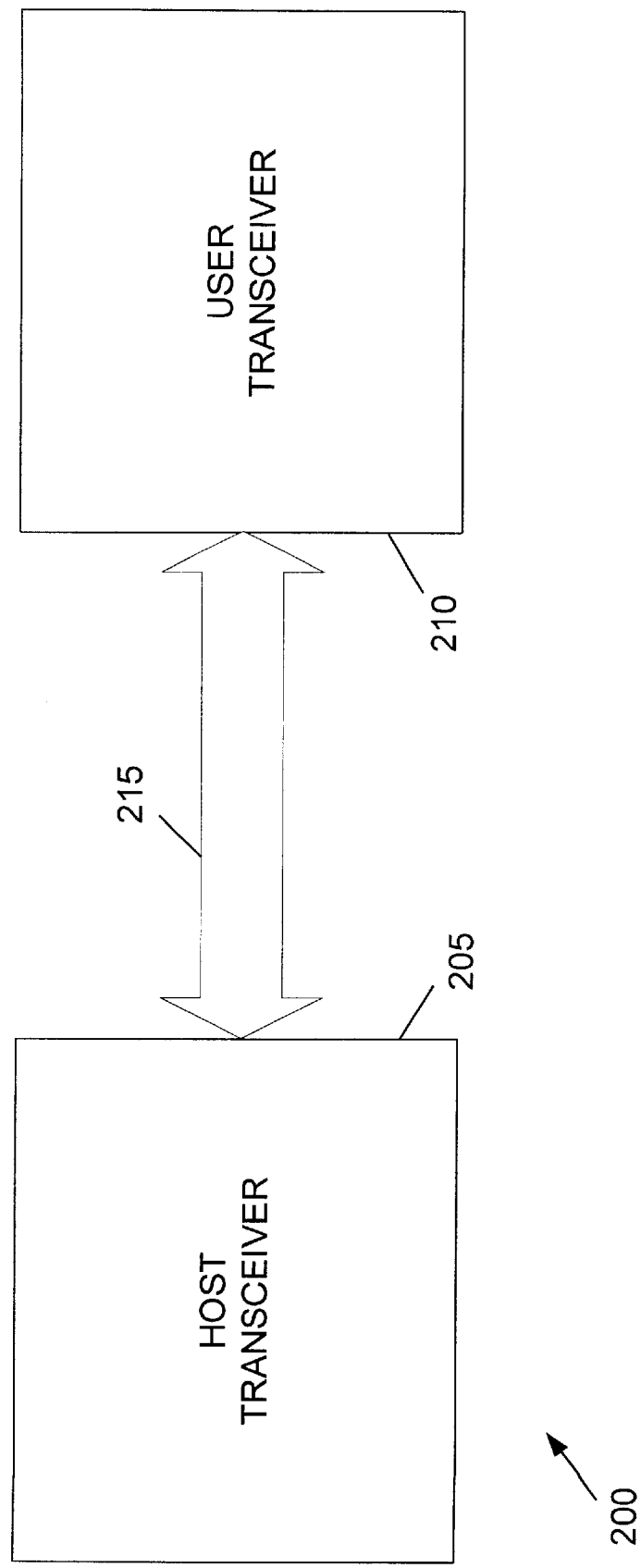
FIG. 2 illustrates a communications system in accordance with the present invention.

Referring now to the drawings, and in particular to FIG. 2, a communications system 200 in accordance with the present invention is illustrated. The communications system 200 includes a host transceiver 205 and a user transceiver 210 capable of communicating with each other over a connection 215. The connection 215 may be either a wire-link connection or a wire-less connection, depending on the application. Generally, the host and user transceiver 205, 210 communicate with each other using a common communications protocol (i.e., a communications standard such as DECT, PHS, NETBIOS, TCP/IP, etc.) that defines the transmission parameters, such as the format of data to be transmitted, error checking algorithm, retransmission scheme, and the like. In one embodiment, the host and user transceivers 205, 210 may be a pair of modems or fax machines. In an alternative embodiment, the host transceiver 205 may be a base station for a cellular telephone network or a WLL network, and the user transceiver 210 may be a cellular telephone of the cellular telephone network or a wireless subscriber unit (WSU) of the WLL network.

Figure 3:
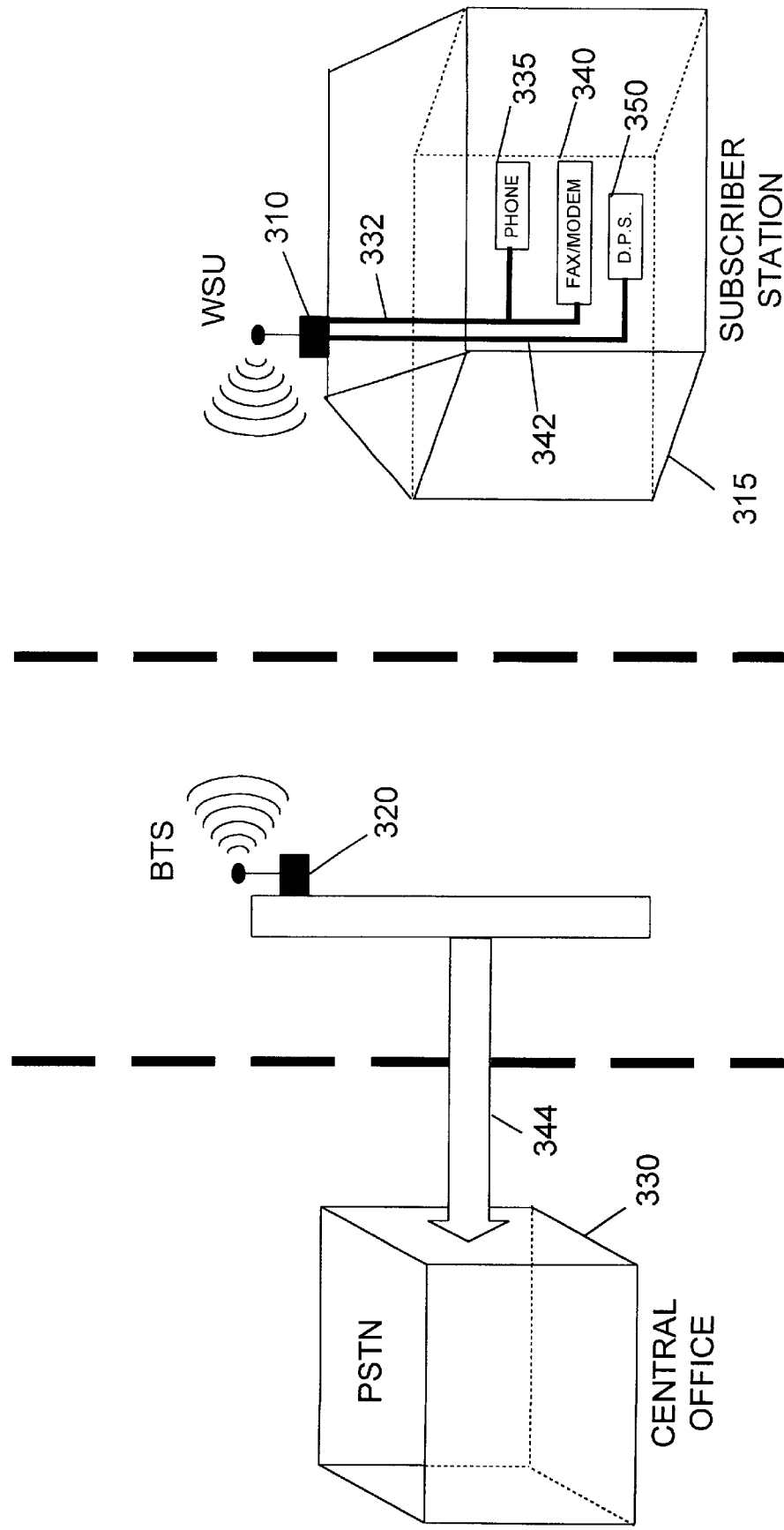
FIG. 3 illustrates a block diagram of a WLL network in accordance with the present invention.

FIG. 3 illustrates a stylized block diagram of an alternative embodiment of a communications system 300 in accordance with the present invention. Specifically, the communications system 300 in the illustrated embodiment is a WLL network 300, where the user transceiver 210 is a Wireless Subscriber Unit (WSU) 310 located at a subscriber station 315, and the host transceiver 205 is a remote Basestation Transceiver System (BTS) 320. The BTS 320 links the WSU 310 to a central office 330, thus allowing a user at the subscriber station 315 to communicate with other subscriber stations (not shown) through the central office 330. In the illustrated embodiment, the WSU 310 is capable of supporting voice and/or data communications. Specifically, the WSU 310 supports a single analog line 332 for a telephone 335 or a modem 340 to use, as well as a data line 342 for providing packet switched data access to a data processing system 350. In some cases the data line 342 can be removed and data can be modulated to share the same line 332 as that used for voice. This requires a specialized data modem (not shown) within the WSU 310 and data processing system 350. A connection 344 between the BTS 320 and the central office 330 may be made via a wire-line, fiber or microwave link, depending on the bandwidth, distance, and the terrain.

One popular WLL protocol is the DECT protocol, which is based on a micro-cellular radio communication system that provides low-power radio (cordless) access, at least as it pertains to the WLL network 300, between the WSU 310 and the BUS 320 at ranges from a few hundred meters up to 15 kilometers. The DECT protocol is described in the European Telecommunications Standard, ETS 300 175 (Parts 1 through 9) (1996), entitled "Radio Equipment and Systems (RES); Digital Enhanced Cordless Telecommunications (DECT); Common Interface (CI)," which is incorporated herein by reference in its entirety. Other pertinent DECT protocol references include ETR 185, entitled "Radio Equipment and Systems (RES); Digital European Cordless Telecommunications (DECT); Data Services Profile (DSP); Profiles Overview"; ETS 300 765-1, ETS 300 765-2 entitled "Radio Equipment and Systems (RES): Digital European Cordless Telecommunications (DECT); Radio in the Local Loop (RLL) Access Profile (RAP); Part 1: Basic telephony services"; ETS 300 765-2, entitled "Radio Equipment and Systems (RES); Digital European Cordless Telecommunications (DECT); Radio in the Local Loop (RLL) Access Profile (RAP); Part 2: Advanced telephony services"; Draft EN (reference number not yet assigned), V0.0.1 (1998-11), entitled "Digital European Cordless Telecommunications (DECT); Data Services Profile (DSP); DECT Packet"; EN 300 435, entitled "Radio Services (DPRS) Digital European Cordless Telecommunications (DECT); Data Services Profile (DSP); Base standard including inter-working to connectionless networks (Service types A and B, class 1)"; and EN 300 651, entitled "Digital European Cordless Telecommunications (DECT); Data Services Profile (DSP); Generic data link service (service type C, class 2)," which are incorporated herein by reference in their entirety. Exemplary technical characteristics of the DECT protocol are shown below in Table 1.

TABLE 1

Technical Characteristics for DECT protocol

| | |
|---|---|
| Frequency Band | 1880–1900 MHz |
| Number of Carriers | 10 |
| Carrier Spacing | 1.728 MHz |
| Peak Transmit Power | 250 mW |
| Carrier Multiplex | TDMA; 24 slots per frame |
| Frame Length | 10 ms |
| Basic Duplexing | TDD using 2 slots on same RF carrier |
| Gross Bit Rate | 1152 kbit/sec |
| Net Channel Rates | 32 kbit/sec B-field (traffic) per slot |
| Packet Data (effective bit rate) | 552 kbit/sec |

Figure 4:
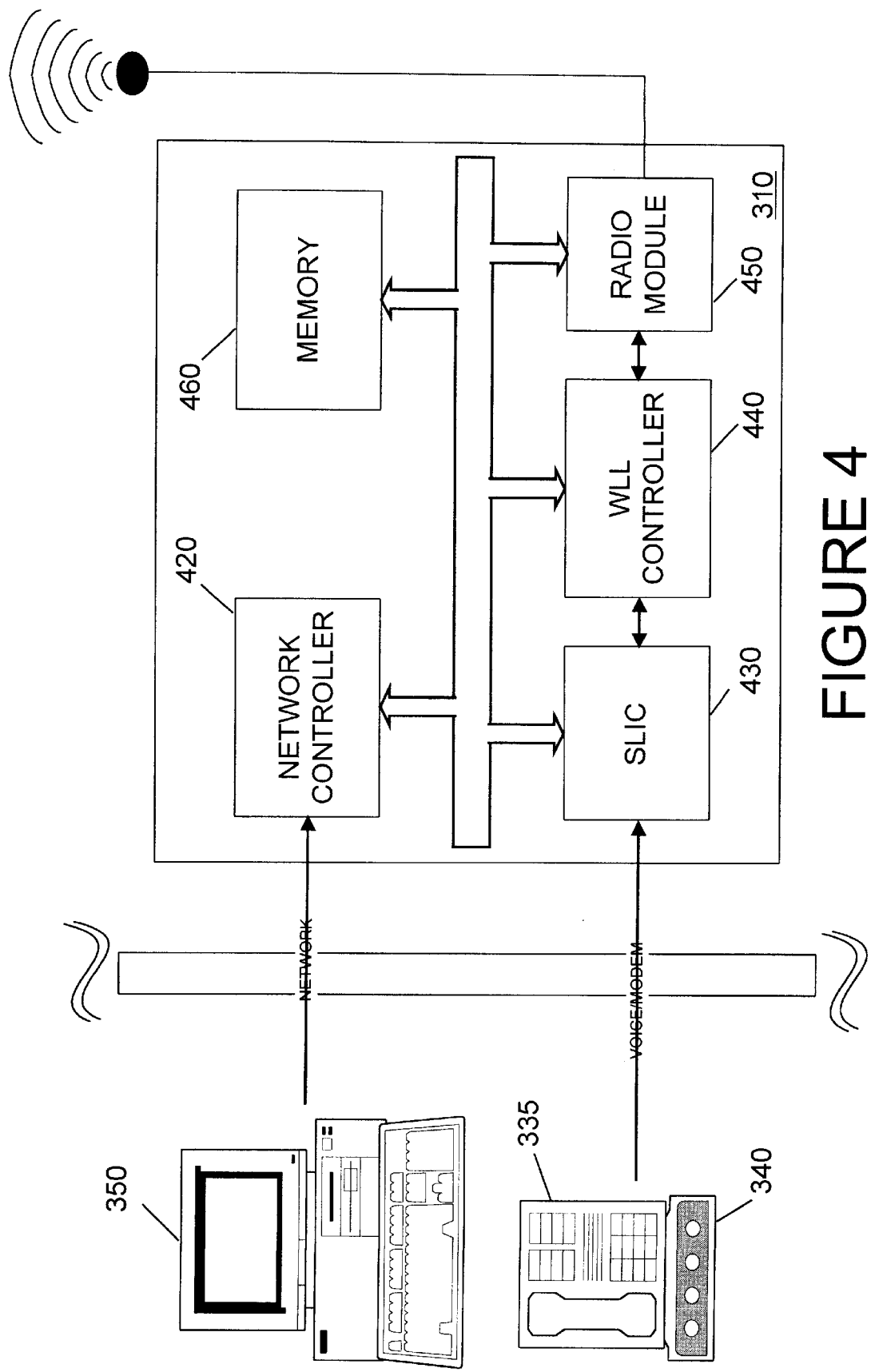
FIG. 4 depicts a Wireless Subscriber Unit of the WLL network of FIG. 3 in accordance with the present invention.

FIG. 4 illustrates a stylized block diagram of one embodiment of the WSU 310 in accordance with the present invention. The data processing system 350, the phone 335, and the modem 340 provide packet data, voice data, and modem data, respectively, to the WSU 310, which then transmits the data to the BTS 320. The data processing system 350 is capable of providing packet data to a network controller 420 of the WSU 310 through a network card (not shown), such as a token ring card, an Ethernet card, a PCnet card, and the like. A Subscriber fine Interface Circuit (SLIC) 430 of the WSU 310 provides the voice/modem 335, 340 interface. A WLL controller 440 formats the packet, voice, and modem data according to the DECT protocol and then interfaces to a radio module 450 for transmission and reception. Similarly, the WLL controller 440 is also responsible for processing received DECT frames, decoding and storing protocol messages, and directing the user information to an appropriate destination.

The packet data is provided by the data processing system 350 to the network controller 420, which formats the packet data into smaller sized protocol data units (PDUs) and stores the PDUs in an external memory 460 of the WSU 310. The external memory 460 acts as a buffer to the WLL controller 440 because the WLL controller 440 is generally unable to transmit the packet data at the rate the data is provided to the WLL controller 440 by the data processing unit 350. Accordingly, the PDUs are stored in the external memory 460 by the network controller 420, and later retrieved by the WILL controller 440 for transmission on an as needed basis.

The DECT protocol currently defines packet data support as standard U-plane service, LU2 class 1 with Medium Access Control MAC) layer $I_p$ error correction (commonly referred to as MOD2-ARQ). The Data Link Control (DLC) layer U-plane utilizes the $I_p$ channel with the protected mode MAC layer procedure. The error correction mode specified is the modulo-2 $1_p$ retransmission scheme for the forward channels and error detection based on the acknowledgement provided by a reverse bearer. The two types of data bearers are duplex and double simplex bearers. The flow of data in a duplex bearer slot is bidirectional, while the flow of data for double simplex bearers is unidirectional.

FIG. 5a illustrates a DECT (TDMA) frame 500 that may be utilized by the present invention. The frame 500 is of a 10 millisecond duration and is divided into 24, grouped as twelve receive and twelve transmit slots. FIG. 5b illustrates one slot 504 of the frame 500. The slot 504 of the frame 500 includes a first guard band 505, an S-field 507, an A-field 509, a B-field 510, an X and Z field 512, 514, and a second guard band 516. FIG. 5c illustrates a more detailed diagram of the B-field 510 that is utilized for transferring packet data in the protected mode. Specifically, the B-field 510 of the frame 500 includes four sub-fields 530(a–d) (hereinafter referred to as "data fields"), wherein a corresponding error detection field 535(a–d) protects each data field 530(a–d). Although not so limited, in the illustrated embodiment, the error detection fields 535(a–d) are Cyclic Redundancy Code (CRC) fields. Cyclic redundancy checking is a method of checking for errors in data that has been transmitted on a communications link. The sending device (i.e., either the WSU 310 or BTU 320) applies a 16- or 32-bit polynomial to each data field 530(a–d) that is to be transmitted and appends the resulting cyclic redundancy code (CRC) to each data field 530(a–d). The receiving end (i.e., either the WSU 310 or BTU 320) applies the same polynomial to the data and compares its result with the result appended by the sender. If they agree, the data within the data fields 530(a–d) has been received successfully. If not, the sender can be notified to retransmit the data. The data fields 530(a–d) hold packet data that is transferred to and from the WSU 310, and the CRC fields 535(a–d) are utilized to determine the integrity of the packet data stored in the data fields 530(a–d). Each data field 530(a–d) in the illustrated embodiment, as defined by the ETSI, comprises 64 bits, and each CRC field 535(a–d) comprises 16 bits. The terms "field" and "data field," as utilized herein, refer to at least a portion of the frame 500, and thus may include one or more bits of the frame 500.

It is contemplated that the present invention is applicable to a variety of communications systems employing RDMA technology. However, for illustrative purposes, the present invention is described with respect to the DECT TDMA frame 500.

The functionality of the WLL controller 440 may be controlled by software, hardware, or any combination thereof. Although not so limited, in the illustrated embodiment, the software handles the higher levels of functionality that include portions of the Medium Access Control (MAC) layer, the Data Link Control (DLC) layer, network layer, and lower layer management entity. The software may also perform other control functions for the WLL, controller 440, such as defining the modes of operation, ascertaining the slots and frequencies that are to be utilized, and determining the timing configurations for the radio control signals.

The present invention includes implementing certain functions to the WLL controller 440 in hardare, especially functions where real time operation is desirable. For example and as is described in more detail below, a method of transferring data from the memory 460 to an internal memory of the WLL controller 440 is implemented primarily in hardware to increase the data throughput between the WSU 310 and BTS 320.

Figure 6:
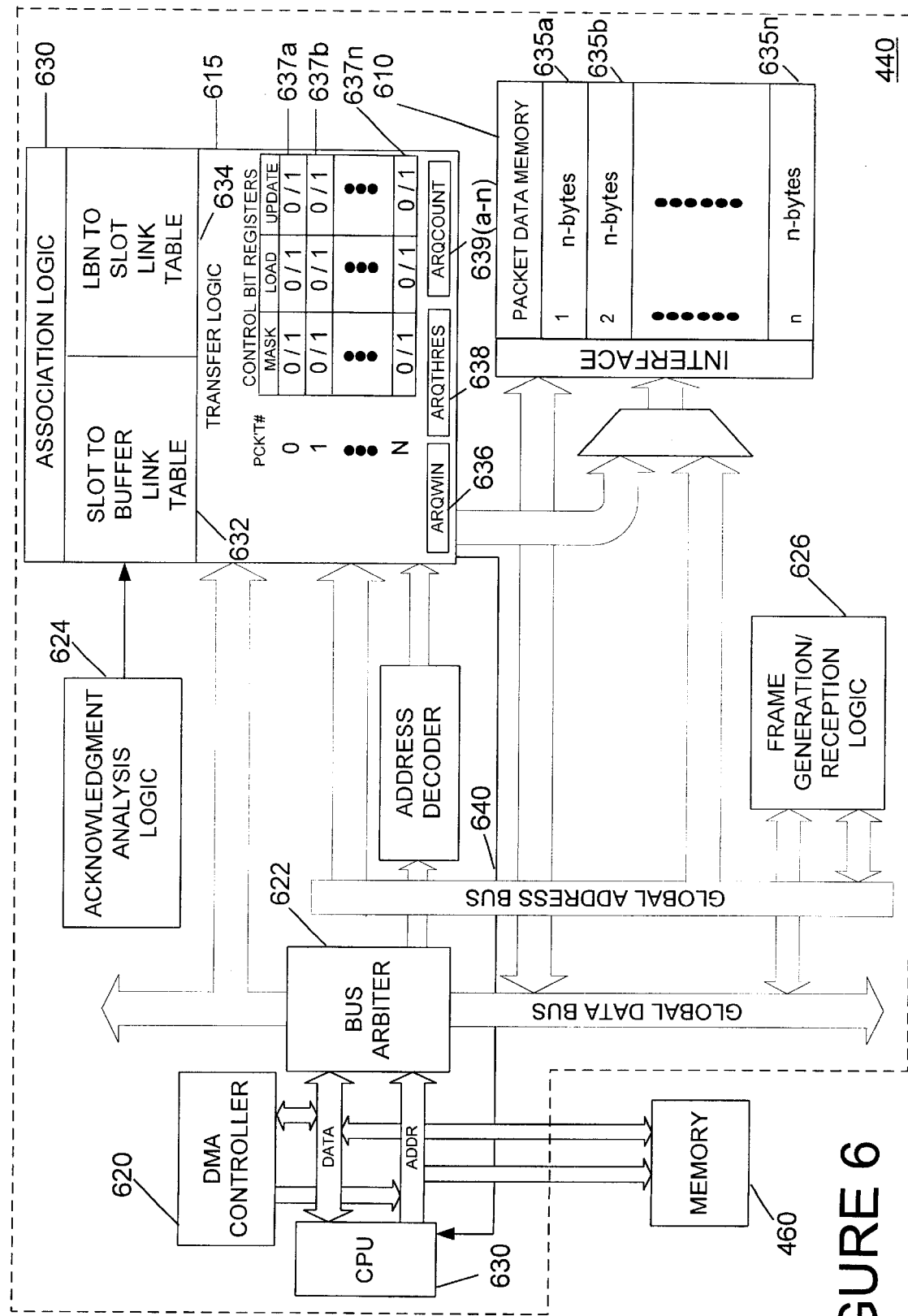
FIG. 6 illustrates a stylized block diagram of the Wireless Subscriber Unit of FIG. 4 in accordance with the present invention.

FIG. 6 illustrates a stylized block diagram of the WLL controller 440 in accordance with the present invention. In the interest of clarity and to avoid obscuring the invention, only that portion of the WLL controller 440 that is helpful in understanding the invention is illustrated. More specifically, FIG. 6 illustrates a portion of the WLL controller 440 that may be utilized for transmission and reception of packet data. The WLL controller 440 includes a transfer logic 615, which is capable of moving blocks of data from the external memory 460 to an "on-chip" packet data memory 610 without a need of continuously reprogramming a direct memory access ("DMA") controller 620 by a CPU 630 of the WLL controller 440. The transfer logic 615 accomplishes this transfer by asserting or de-asserting a request on line 640. A bus arbiter 622 is provided to allow both the CPU 630 and the transfer logic 615 via the DMA controller 620 to access the packet data memory 610. The WLL controller 440 includes acknowledgement-analysis logic 624 as well as frame generation/reception logic 626. The frame generation/reception logic 626 generates frames 500 using at least a portion of the data stored in the packet data memory 610 and transmits the frames 500 to the peer station. The frame generation/reception logic 626 extracts and stores data in the packet data memory 610 from the frames 500 that are received from the peer station.

Generally, each frame 500 transmitted from the peer station includes an acknowledgement of an earlier transmission by the WSU 310. The acknowledgement-analysis logic 624 of the WLL controller 440 analyzes acknowledgements transmitted by the peer station. Acknowledgements are received in an active packet data receive slot (i.e., a reverse bearer) of the frame 500. Acknowledgements for double simplex bearers are received in a MAC-MOD2-ACK message, on a logic bearer number (LBN) basis. Specifically, the acknowledgements for double simplex bearers reside in at least one of the data fields of B-field 510 of the frame 500, as shown in FIG. 7a. The acknowledgement for a duplex bearer pair is received in the A-field 509 (see FIG. 5b) of the receive bearer of the frame. As will be described in more detail below, the acknowledgement-analysis logic 624 utilizes association logic 630, which, in one embodiment, comprises at least one of slot to buffer link table 632 and a LBN to slot link table 634 to analyze acknowledgements transmitted by the peer station. In accordance with present invention, the WLL controller 440 utilizes the association logic 630 to quickly and efficiently analyze the acknowledgements and to prioritize the transmission of data such that bandwidth is preserved.

As can be seen in FIG. 7a, the MAC-MOD2-ACK messages for the double simplex bearers may occupy at least one of the data fields of the B-field 510 of the frame 500 (i.e., bits 8 through 63 of a data field). A double simplex bearer comprises two bearers. The two bearers are typically 12 slots apart (e.g., $1^{st}$ and $13^{th}$ slots), and share a common LBN. However, despite having a common LBN, each bearer of the double simplex bearer has its own acknowledgement. The acknowledgement of the first bearer of a double simplex bearer is received in the first portion of one of the data fields 530(a–d), as shown in FIG. 7b. The acknowledgement of the second bearer of a double simplex bearer is received in the second portion of one of the data fields 530(a–d), as shown in FIG. 7c.

Referring back to FIG. 6, the transfer logic 615 is capable of transferring data from the external memory 460 to an "on-clip" memory (hereinafter referred to as "packet data memory") 610 of the WLL controller 440. Specifically, transfer logic 615 is capable of moving blocks of data from the external memory 460 to an "on-chip" packet data memory 610 without a need of continuously reprogramming a direct memory access ("DMA") controller 620 by a CPU 630 of the WLL controller 440. The data transfer is initiated/terminated by asserting/de-asserting a request on the line 640. Once the data is transferred from the external memory 460 to the packet data memory 610, the data stored in the packet data memory 610 is transferred to the radio module 450 for transmission to its counterpart, the BTS 320 (see FIG. 3). The description hereinafter relates to transmission of data in an uplink connection (i.e., transfer from the WSU 310 to BTS 320), however, the present invention is equally applicable in a downlink connection (i.e., transfer from the BTS 320 to the WSU 310).

The DECT retransmission scheme for the packet data transmission sometimes requires that a variable amount of data be moved from the external memory 460 to the packet data memory 610. This is due to the fact that data from earlier frames 500 may occasionally need to be retained in the packet data memory 610 for retransmission and thus cannot be overwritten by new data. The transfer logic 615 is capable of determining the amount of new data that is required for every frame from the external memory 460, initiating the transfer from the external memory 460 to the packet data memory 610 by asserting a DRQ on the line 640 using the DMA controller 620, and then terminating the DMA transfer by de-asserting a DRQ signal on the line 640. The transfer logic 615 generates the local packet data address for storage of the data during the transfer as described in detail below.

The packet data memory 610 can be any of a variety of single-ported or multi-ported memory known to the art, including static random access memory (SRAM), dynamic random access memory (DRAM), flash, or any other programmable memory. In the illustrated embodiment, the packet data memory 610 is a dual-port memory comprising a plurality of buffers 635(a–n). It is contemplated that the size and type of the memory 610 employed may vary from one implementation to another. A dual-port memory 610 allows a simultaneous read and write access to the packet data memory 610. The buffers 635(a–n) of the packet data memory 610 are utilized to store data that is transmitted, as well as for data that is received. In this particular implementation, the packet data memory 610 includes twenty-four 32-byte buffers that correspond to the number of time slots 504 of the DECT frame 500 and the amount of user data carried in each slot 504. Thus, there is a corresponding buffer 635(a–n) for each time slot 504. It should be noted that although there is a one-for-one correspondence of slots 504 to buffers 635(a–n), a slot 504 can be assigned to any one of the buffers 635(a–n). The software, in one embodiment, identifies the buffers 635(a–n) that will be utilized for transmission/reception of packet data. As will be described below, the slot to buffer link table 632 may serve a multitude of purposes, including tracking the buffers 635(a–n) to slots 504 association.

FIG. 8 illustrates one embodiment of the slot to buffer link table 632. Although not so limited, the slot to buffer link table 632 includes at least one field for each slot 504 of the frame 500. Each "slot" field has three corresponding fields: packet data active field, carrier type field, and packet data buffer field. The "packet data active" field identifies whether the corresponding slot 504 is being utilized for transmission of packet data. The "packet data active" field, for example, may include a binary digit 1 or 0 to indicate whether the corresponding slot is being utilized for transmitting packet data. The "carrier type" field identifies the type of carrier associated with that slot 504, such as a full duplex bearer, double simplex bearer, and the like. The "packet data buffer" field of each slot 504 identifies the buffer 635(a–n) that is associated with that particular slot 504. The "packet data buffer" includes at least a portion of the memory address of each buffer 635(a–n) to identify the buffer 635(a–n).

The slot to buffer link table 632 is generally initialized before the communication between the WSU 310 and BTS 320 commences. That is, the slot to buffer link table 632 is updated once the WLL controller 440 of the WSU 310 ascertains the slots 504 and frequencies that will be utilized during communications with the BTS 320. Accordingly, the number of slots 504 that are dedicated for transmitting packet data will determine, at least initially, the number of packet data buffers 635(a–n) that need to be allocated. Additional butters 635(a–n) may be allocated during bearer handover. In certain environments, it may be necessary to transmit the same data in multiple slots 504. This is accomplished by assigning a buffer 635(a–n) to multiple slots 504 and programmed as such in the slot to buffer link table 632. In one embodiment, the slot to buffer link table 632 acts similar to a status register in that it monitors the bus and extracts formats, and organizes information from the bus in a manner that requires little intervention from the software.

FIG. 9 illustrates one embodiment of the LBN to slot link table 634, which allows for a quick and efficient method for associating each LBN to a corresponding slot 504 of the frame 500. The association of LBNs to the corresponding slots 504 is desirable because the acknowledgement received from the peer station is based on an LBN basis, and not slot basis. Accordingly, in accordance with the present invention, the LBN to slot link table 634 provides a quick and efficient method for converting LBNs to slot values. Although not so limited, the LBN to slot table link table 634 illustrated in FIG. 9 includes fourteen LBN fields for the first and second half of the frame 500. Each LBN field has a corresponding slot number. Those skilled in the art will appreciate that the LBN to slot link table 634 may contain additional entries or fields without departing from the spirit of the invention. Additionally, the number of LBN fields in the LBN to slot link table 634 may vary depending on the application.

In one embodiment of the present invention, the LBN to slot link table 634 is automatically updated every time the slot to buffer link table 632 is revised. That is, the LBN to slot link table 634 acts similar to a shadow register in that it monitors the bus and extracts, formats, and organizes information from the bus in a manner that requires little intervention from the software.

The transfer logic 615 of the WLL controller 440 includes a plurality of control bit registers 637(a–n), wherein each buffer 635(a–n) of the packet data memory 610 has a corresponding control bit register 637(a–n). Each control bit register 637(a–n) comprises a plurality of control bits for configuring the packet data memory 610. Although the present invention employs a control bit register 637(a–n) in conjunction with control bits to configure the packet data memory 610, it is contemplated that other means may also be employed to configure the packet data memory 610.

Those skilled in the art will appreciate that the number and type of control bits employed is implementation specific. In the illustrated embodiment, a mask bit a load bit, and an update bit are utilized. Mask bits identify the buffers 635(a–n) of the packet data memory 610 that will be utilized for data transfer. For example, if the mask bits of the first and second control bit registers 637a, 637b are set to zero, and the mask bits for the remaining control bit registers 637(c–n) are set to one, then only the first and second buffers 65a, 635b of the packet data memory 610 are utilized to transmit data. Accordingly, only the first and second buffers 635a, 635b of the packet data memory 610 are employed to store data that is retrieved from the external memory 460 for transmission. It should be noted that the software may utilize the unmasked buffers 635(a–n) to store and then transmit data other than packet data. In the illustrated embodiment, the mask bits allow the size of the packet data memory 610 that is employed to transmit data to be configurable, as well as allow the buffers 635(a–n) to be non-contiguous. The load bits identify which "masked" buffers 635(a–n) (i.e., buffers having the mask bit set to zero) of the packet data memory 610 require new data. For instance, referring to the above example, if the load bits of the first and second buffers 635a, 635b are zero and one, respectively, then only the second buffer 635b requires new data. In the illustrated embodiment, the load bits allow the transfer logic 615 to fetch a variable amount of data from the external memory 460 without the intervention of the CPU 630, as described in more detail below. The update bits identify the buffers 635(a–n) from which the data has been extracted and transmitted to the BTS 320.

As mentioned earlier, the acknowledgements for double simplex bearers are received in a logic bearer number (LBN) format. However, data is transmitted and received on a slot-by-slot basis. Accordingly, it is necessary for the acknowledgement-analysis logic 624 to match each LBN acknowledgement to its corresponding slot. The acknowledgement-analysis logic 624 analyzes the bearer acknowledgement and then, based on the results of an earlier transmission, updates the load bit in the control bit registers 637(a–n). Generally, the acknowledgement-analysis logic 624 utilizes the LBN to slot link table 634 to ascertain a corresponding slot for each LBN. The slot to buffer link table 632 is then utilized to associate each slot 504 to a corresponding buffer 635(a–n) in the packet data memory 610. The two tables 632, 634 are in this way used to generate an end to end association of LBNs to buffers 635(a–n). The association of slot 504 to a particular butter 635(a–n) is desirable to allow the acknowledgement-analysis logic 624 to update the load bit in the control bit registers 637(a–n).

Figure 10:
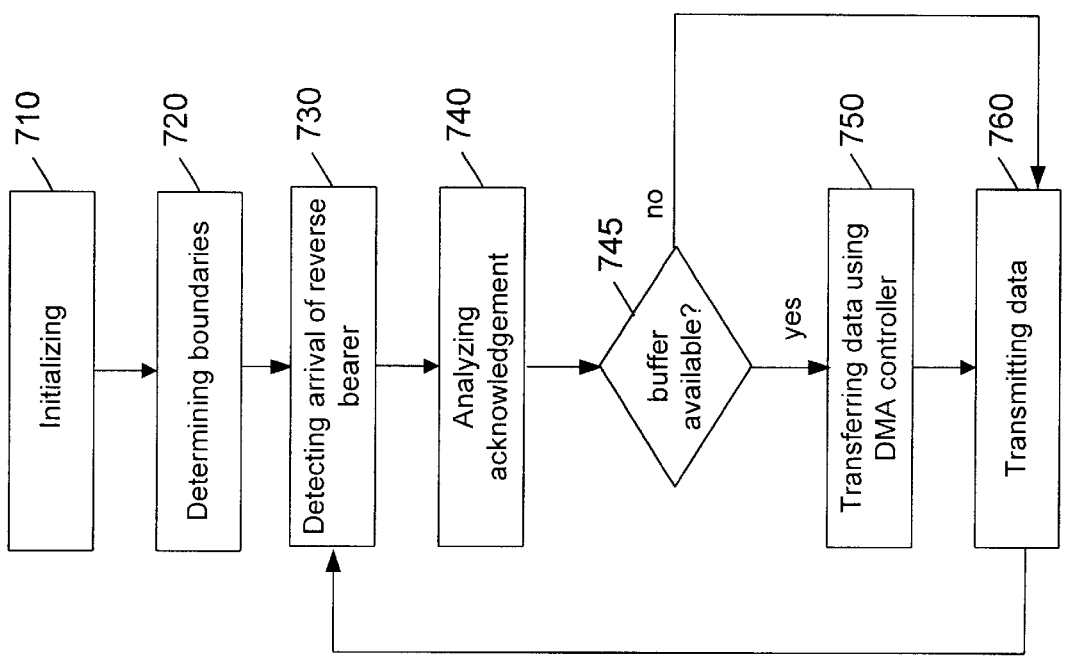
FIG. 10 illustrates a method in accordance with the present invention that may be employed by the Wireless Subscriber Unit illustrated in FIG. 6.
Figure 11:
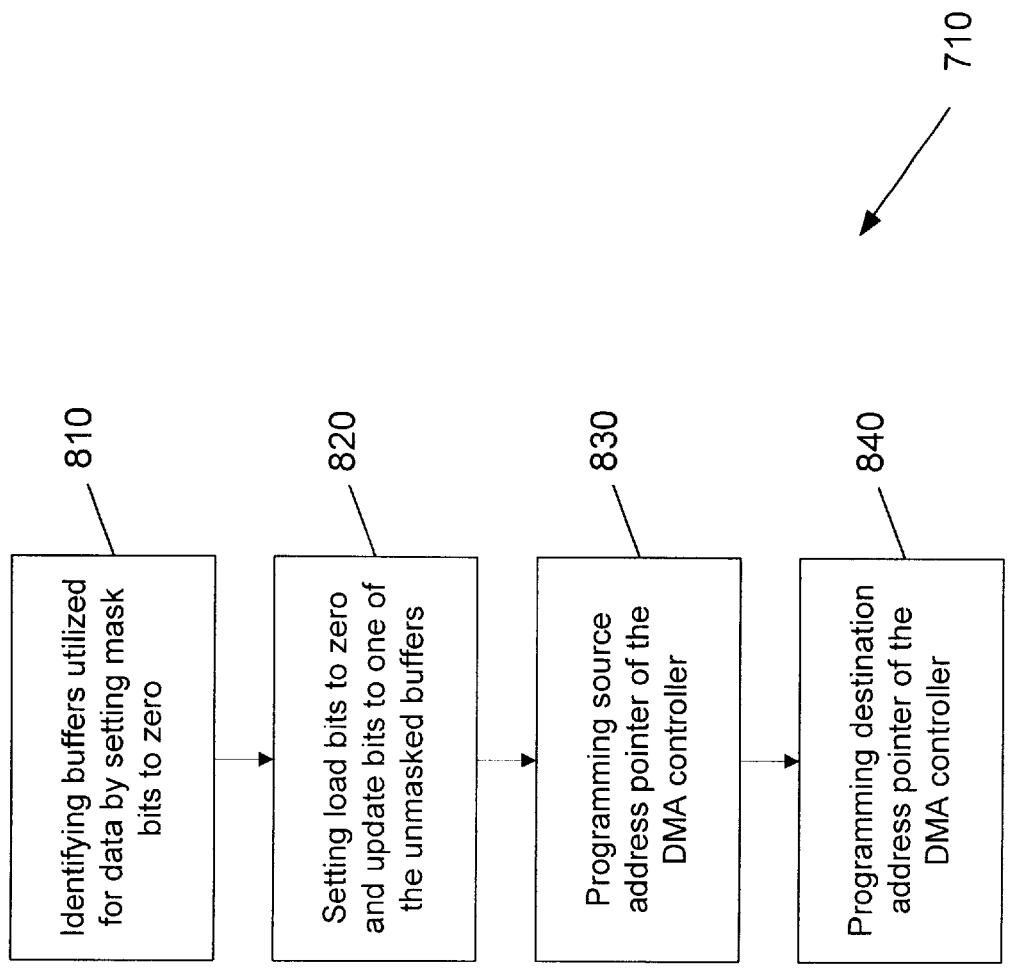
FIG. 11 illustrates a method in accordance with the present invention that may be employed by the Wireless Subscriber Unit illustrated in FIG. 6.

In accordance with the present invention, the transfer logic 615 of the WLL controller 440 is capable of transferring data from the external memory 460 to the packet data memory 610 without the real-time intervention of the central processing unit 630. The WLL controller 440 employs a method of FIG. 10 to accomplish the data transfer from the external memory 460 to the packet data memory 610. The method of FIG. 10 begins at block 710. where the control bit registers 637(a–n) and the DMA controller 620 are initialized. The initialization process is illustrated in FIG. 11. At block 810, the control bit registers 637(a–n) are initialized by setting the mask bits of the buffers 635(a–n) of the packet data memory 610 that are to be utilized for the packet data asymmetric connection to zero. At block 820, the load bits for the unmasked buffers 635(a–n) are set to zero to indicate that the unmasked buffers 635(a–n) need new data, and the update bits are set a value of one to indicate that the contents of the unmasked buffers 635(a–n) have not yet been extracted and transmitted to the BTS 320. At block 830, the source address pointer of the DMA controller 620 is programmed to point to the relevant address in the external memory 460. The source address pointer of the DMA controller 620 is programmed to increment following every transfer. At block 840, the destination address pointer of the DMA controller 620 is programmed to point to a transfer logic register 615 that generates a final destination address for storing data in the packet data memory 610. The destination address pointer of the DMA controller 620 is programmed such that it does not increment following every transfer since the final destination address is generated by the transfer logic as described below.

Referring back to FIG. 10, after the initialization process of the block 710 is complete, at block 720, the transfer logic 615 determines the 32-byte boundaries (starting with the initial address) of the buffers 635(a–n) of the packet data memory 610. The boundaries are identified by the transfer logic 615 for two primary reasons: First, to determine if a buffer 32-byte segment) 635(a–n) needs to be skipped while data is being transferred from the external memory 460. A buffer 635(a–n) is skipped if either its corresponding mask or load bit is set to one. Second, to determine if a buffer pointer has wrapped around (i.e., the buffer pointer is past the last unmasked buffer 635(a–n). The transfer logic 615 ensures that the buffer pointer points to the next unmasked buffer 635(a–n) that is available for storing data.

At block 730, the arrival of a reverse bearer is detected. A reverse bearer, in an uplink connection, for example, generally provides an acknowledgement to the WSU 310 from the BTS 320, indicating whether the transmission was successful or not. In response to detecting the reverse bearer, at block 740, an acknowledgement analysis is performed on an LBN basis of the data transmitted during an earlier frame. That is, as per DECT protocol, the reverse bearer from the BTS 320 provides an acknowledgement of an earlier transmission, wherein the reverse bearer indicates, on an LBN basis, which data successfully reached the BTS 320. Because it is necessary to perform the acknowledgement analysis of the block 740 for only those buffers 635(a–n) for which the data was transmitted, the acknowledgement data for only those buffers 635(a–n) having an update bit equal to zero are analyzed. During the acknowledgement analysis at the block 740, the buffers 635(a–n) whose update bits are equal to zero are identified. Accordingly, if the transmission was successful for unmasked buffers 635(a–n) having an update bit of zero, then the corresponding load bits of these buffers 635(a–n) are set to zero, indicating that these buffers 635(a–n) need new data.

In certain instances, the data transmission may be unsuccessful. In these instances, the transfer logic 615 utilizes registers ARQWIN, ARQTHRES, and ARQCOUNT 636, 638, 639(a–n) to manage the lifetime (e.g., number of retransmissions allowed) of the data stored in buffers 635(a–n). ARQWIN register 636 may be a programmable register that can be set by software to define the maximum number of retransmissions allowed for data stored in the unmasked buffers. ARQTHRES register 638, which can also be a software programmable register, is utilized to specify an ARQ count threshold value. When an ARQCOUNT register 639(a–n) reaches the threshold value specified in ARQTHRES register 638, an interrupt is generated. For example, if the ARQWIN register 636 is programmed to 5 and the ARQTHRES register 638 is set to 2, an interrupt is generated when ARQCOUNT register 639(a–n) reaches 2, indicating that there have been 3 transmissions (the initial transmission, plus two retransmissions) of the same data. Upon the generation of the interrupt, the software can perform a variety of administrative tasks, including but not limited to re-assigning another bearer to transmit the data that was unsuccessfully transmitted. Accordingly, software via the ARQTHRES register 638 may attempt to transmit data on a variety of bearers before the maximum number of retransmission value stored in the ARQWIN register 636 is reached. The ARQCOUNT register 639(a–n) tracks the number of transmissions of data stored in the corresponding buffer 635(a–n). In one embodiment, the value in ARQCOUNT register 639(a–n) for each buffer 635(a–n) is set to the value stored in ARQWIN register 636 and then decremented for each unsuccessful transfer. When the value stored in ARQCOUNT register 639(a–n) reaches zero, the update bit for the buffer 635(a–n) corresponding to the ARQCOUNT register 639(a–n) is set to zero so that new data may be loaded during the next transfer. Accordingly, through the use of the ARWIN. ARQTHRES, and ARQ-COUNT registers 636, 638, 639(a–n), the transfer logic 615 manages the lifetime of data stored within the buffers 635(a–n).

At block 745, the transfer logic 615 determines if at least one buffer 635(*a–n*) is available for receiving data. That is, the transfer logic 615 searches the packet data memory 610 and identifies an unmasked buffer 635(*a–n*) having an associated load bit equal to zero. If at least one buffer 635(*a–n*) is available, then, at block 750, the transfer logic 615 begins to transfer the new data from the external source to the available buffers 635(*a–n*). If no buffer 635(*a–n*) is available to receive the new data (i.e., all the buffers are full), then the step of block 750 is skipped. As will be described in more detail below, the transfer logic 615 initiates a DMA transfer from the external memory 460 by asserting a data request on the line 640. Once the buffers 635(*a–n*) are loaded with new data, at block 760, the WLL controller 440 of the WSU 310 transmits the data to the BTS 320.

At the block 750, the transfer logic 615 initiates a DMA transfer substantially immediately following the reception and processing of a reverse bearer, provided that at least one of the buffers 635(*a–n*) is free to receive new data. In accordance with the present invention, the transfer logic 615 transfers data from the external memory 460 to the packet data memory 610 based on a priority scheme. That is, as is described in more detail in FIG. 12. the priority scheme, in one embodiment, calls for retrieving data into buffers based on the order the slots 504 are transmitted within a frame 500. For example, assuming the acknowledgement is received on a reverse bearer in slot 5, the transfer logic 615 starts from slot 6, the next active slot, for example, to see if the buffer 635(*a–n*) corresponding to slot 6 needs to be loaded with new data. If yes, the buffer 635(*a–n*) corresponding to slot 6 is loaded with new data. If not, the next slot (i.e., slot 7) is checked. The above process continues for the remaining slots 504 of the frame 500 until all of the slots 504 up to the reverse bearer slot have been checked.

Figure 12:
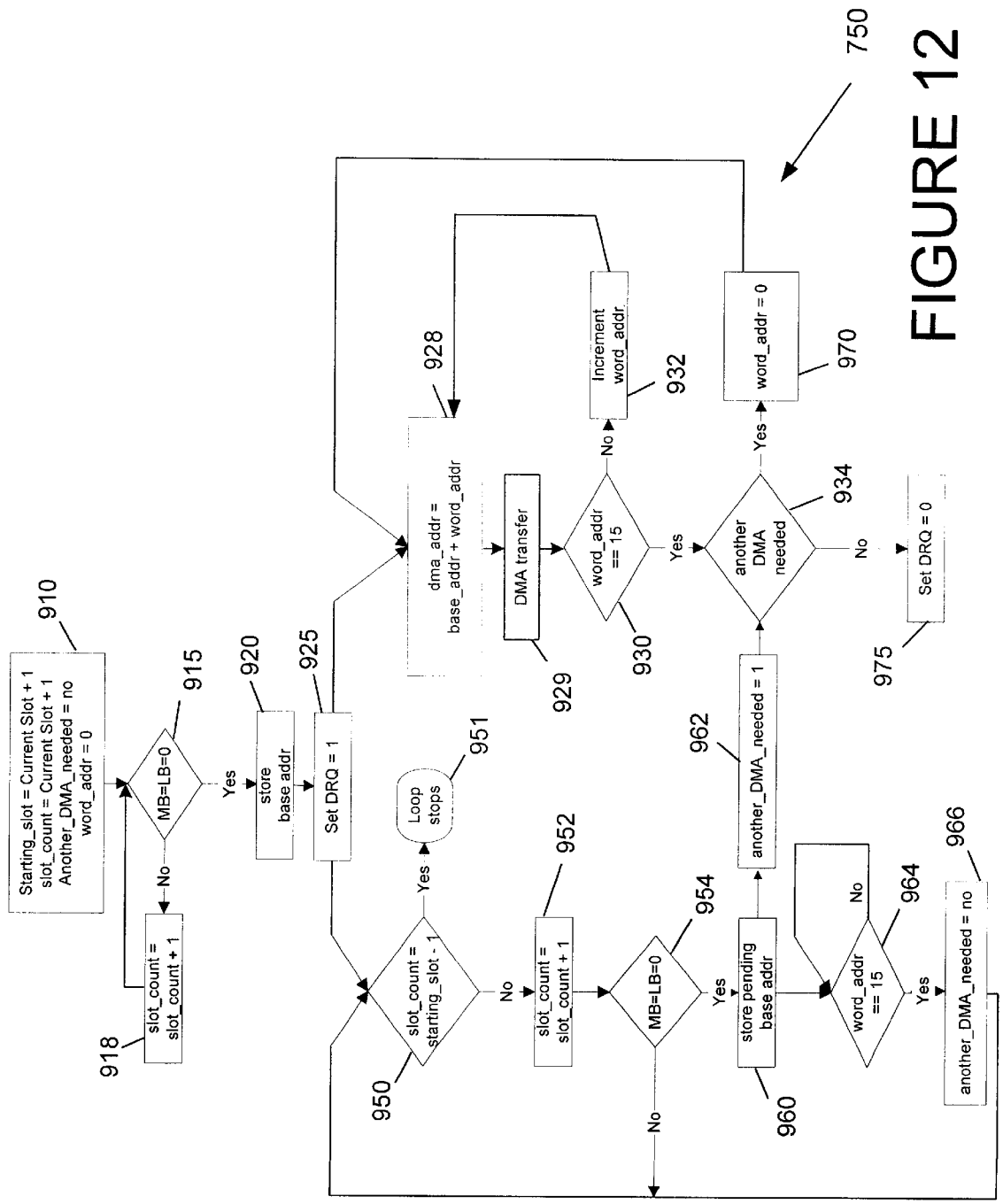
FIG. 12 illustrates a method in accordance with the present invention that can the employed by the Wireless Subscriber Unit illustrated in FIG. 6.

The method of FIG. 12 illustrates the transfer of data from the external memory 460 to the packet data memory 610. At block 910 of FIG. 12, several variables are initialized, such as "starting_slot," "slot_count," "another_DMA_needed," and "word_addr." The starting_slot variable is utilized as a reference point to identify when all of the buffers 635(*a–n*) corresponding to the slots 504 of the frame 500 have been analyzed. The slot_count variable is utilized as a pointer to step through the slots 504 of the frame 500 until the slot 504 identified by the starting_slot variable (i.e., reverse bearer slot) has been reached. Initially, the starting_slot and slot_count variables point to the next slot 504 after the reverse bearer slot 504. The another_DMA_needed variable is used as a flag to indicate whether a buffer 635(*a–n*) of the packet data memory 610 needs new data. The word_addr variable is utilized as a counter to ensure that a particular buffer 635(*a–n*) has been completely loaded. In the illustrated embodiment, although not so limited, because of the size of each buffer 635(*a–n*) is 32 bytes, the word_addr is reset after 16 iterations.

At block 915, the transfer logic 615 analyzes the mask and load bits of the buffer 635(*a–n*) corresponding to the slot 504 identified by the slot_count variable (hereinafter also referred to as the "current buffer"). At the block 915, the slot_count variable points to the slot 504 after the reverse bearer slot (i.e., see block 910). The transfer logic 615 utilizes the slot to buffer link table 632 to associate slots 504 to corresponding buffers 635(*a–n*). If at the block 915 the mask and load bits of the buffer 635(*a–n*) corresponding to the slot 504 identified by the slot_count variable are not zero, then the slot_count variable is incremented to point to the next slot 504. A mask bit of a zero indicates that the corresponding buffer 635(*a–n*) of the packet data memory 610 is being utilized to transfer data, and a load bit of zero indicates that the corresponding buffer 635(*a–n*) needs to be loaded with new data. Thus, if both mask and load bits of a buffer 635(*a–n*) are zero, then, at the block 910, additional data must be retrieved and stored in the buffer 635(*a–n*). On the other hand, if both the mask and load bits are not equal to zero, then, at block 915, either the buffer 635(*a–n*) is masked off or the buffer 635(*a–n*) contains data that has not been acknowledged. Accordingly, if the mask bit and load bits of a buffer 635(*a–n*) are not equal to zero, then that buffer 635(*a–n*) needs no servicing and the slot_count variable is incremented until a slot 504 is found that has a corresponding builder 635(*a–n*) that needs new data. Once the buffer 635(*a–n*) is found having a mask and load bits of zero, at block 920, at least a portion of the address of the buffer 635(*a–n*) is stored in a register (not shown) for later use.

At block 925, a DRQ on the line 640 is asserted and two separate, yet substantially simultaneous, processes are spawned off. The first process handles a direct memory access request for a current buffer 635(*a–n*), while the second process searches for a next buffer 635(*a–n*) that needs servicing (e.g., needing new data). The second process is able to search for the next buffer 635(*a–n*) needing service because the second process operates faster than the first process. This is because the actual act of transferring data that occurs during the first process generally tends to be slower than the operations performed in the second process.

The steps of the first process are performed by blocks 928, 929, 930, and 932. At the blocks 928, 929, 930, and 932, the transfer logic 615 transfers new data from the external memory 460 to the buffer 635(*a–n*) referenced by the slot_count. At the block 928, the address for the DMA controller 620 is generated by the transfer logic 615 by adding the base address of the current buffer 635(*a–n*) plus an offset specified by the word_addr variable. At the block 929, a DMA transfer is initiated by the DMA controller 620 by asserting a request on the line 640, wherein new data is transferred from the external memory 460 and stored in the buffer 635(*a–n*) identified by the variable dma_addr. As indicated by the blocks 930 and 932, the DMA controller 620 for the current buffer 635(*a–n*) cycles through 16 different address. Each time the word_addr is incremented at the block 932, the DMA controller 620 initiates a DMA transfer and transfers data to the buffer 635(*a–n*) identified by the variable dma_addr, which is calculated at the block 928. Once the current buffer 635(*a–n*) is loaded. at block 934, the transfer logic 615 determines if there is another buffer 635(*a–n*) that needs to be serviced. Whether another buffer 635(*a–n*) needs servicing is determined by the second process, which, as mentioned above, searches for a next buffer 635(*a–n*) that needs servicing.

The steps of the second process begin at block 950, where it is determined whether the slot_count variable has reached the reverse bearer slot 504. The starting_slot, as mentioned above, points to the next slot 504 after the reverse bearer slot 504. If the slot_count, at the block 950, has not processed all the slots 504 up the reverse bearer slot, it means that additional slots 504 remain to be analyzed. Accordingly, at block 952, the slot_count is incremented to point to the next slot 504. If the slot_count, at the block 950, reaches the reverse bearer slot 504, then the second process, at block 951, terminates.

At block 954, the transfer logic 615 analyzes the mask and load bits of the buffer 635(*a–n*) corresponding to the slot 504 identified by the slot_count variable. The transfer logic 615 utilizes the slot to buffer link table 632 to associate the slot 504 identified by the slot_counter variable to its corresponding buffer 635(a–n). If the mask and load bits of the buffer 635(a–n) corresponding to the slot 504 that is identified by the slot_counter are not zero, then, at the block 950, the transfer logic 615 once again determines if the slot_count variable points to the reverse bearer slot 504. The slot_count variable continues to be incremented until the reverse bearer slot 504 has been reached or the mask and load bits of the buffer 635(a–n) being analyzed equal zero. If the mask and load bits of the buffer 635(a–n) corresponding to the slot 504 that is identified by the slot_counter are zero, then, at block 960, the base address of that buffer 635(a–n) is stored in a register for later use, and, at block 962, the another_DMA_needed variable is set to yes. The second process, at block 964, waits until the first process Finishes loading the current buffer 635(a–n). When the current buffer 635(a–n) has been loaded, the another_DMA_needed variable is set to no at block 966. The second process then loops back to the block 950.

The DRQ on the line 640 is de-asserted only when it is determined that no more buffers 635(a–n) of the slots 504 for a given frame 500 need servicing. If it is determined at the block 934, that another buffer 635(a–n) needs servicing, the transfer logic 615 clears the word_addr variable, at block 970, and starts the data transfer for the buffer 635(a–n) starting at the address found in the second process block 960, plus a word address of zero. When no more buffers 635(a–n) of the slots 504 for a given frame 500 need servicing, then transfer logic 615 de-asserts the DRQ on the line 640 at block 975.

Figure 7:
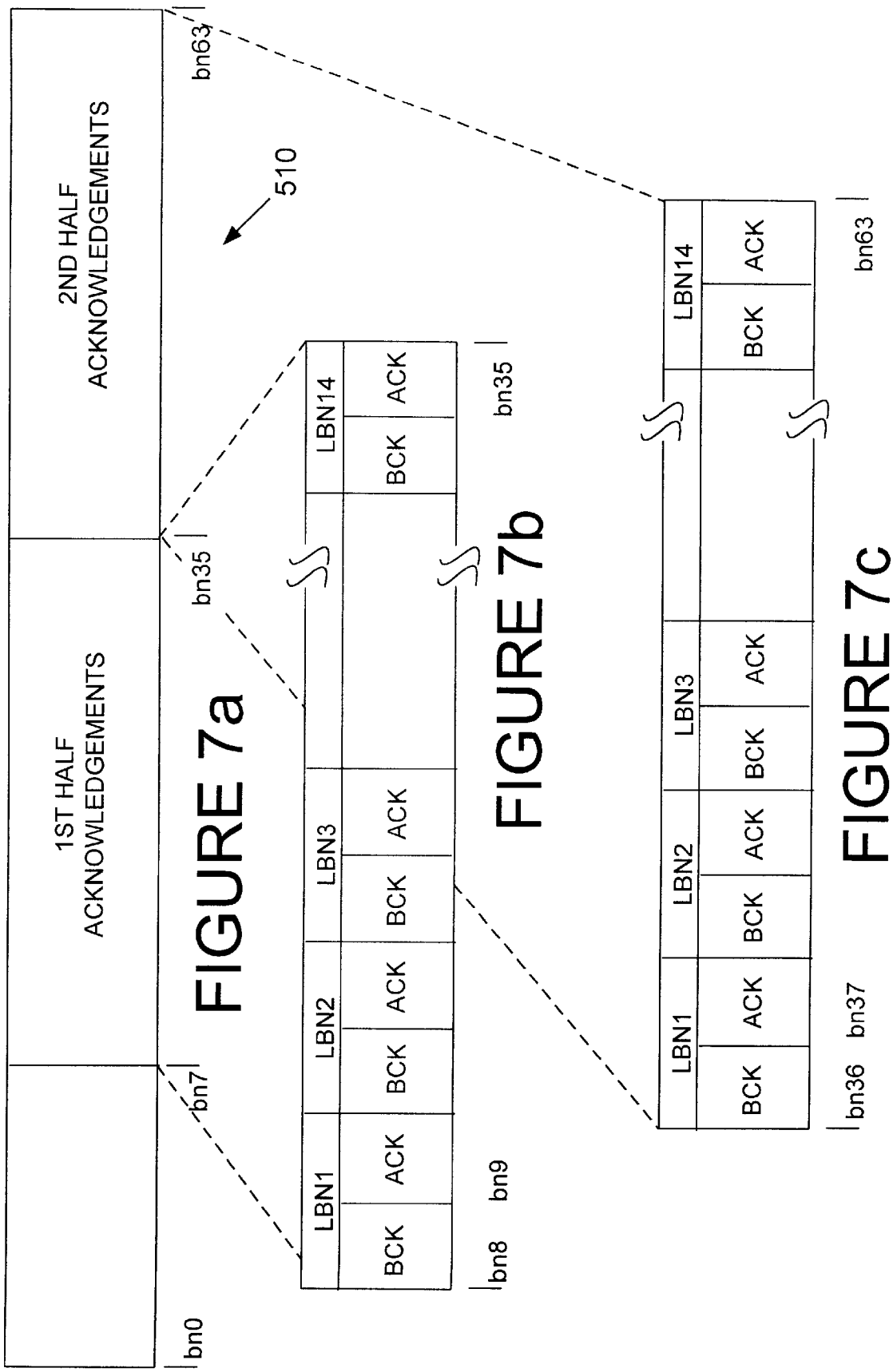
FIGS. 7*a–c* illustrate a portion of the DECT frame of FIG. 5*a* that includes the acknowledgements from the reverse bearer.

As can be seen with reference to FIGS. 7 and 12, the transfer logic 615, in conjunction with the mask and load bits, manages the transfer of varying amounts of data from the external memory 460 to the packet data memory 610. Additionally, the data transfer occurs in accordance with a priority scheme. In the illustrated embodiment, the priority scheme entails transferring data into the corresponding buffers 635(a–n) of the slots 504 sequentially after the reverse bearer slot 504. Accordingly the priority scheme employed in the present invention ensures that new data will be fetched into buffers 635(a–n) in a timely manner after the detection of the reverse bearer slot 504. By making new data available to slots 504 (via the corresponding buffers 635(a–n)) that follow the reverse bearer slot 504, the present invention improves the overall throughput of the communications system 200, 400, since there will be fewer empty slots 504 for a given frame transmission. Once the buffers 635(a–n) of the packet data memory 610 have been loaded with new data, the WLL controller 440 of the WSU 310 transfers the data to the BTS 320.

Although the present invention is described with reference to transferring data from the external memory 460 to the packet data memory 610, it is contemplated that the present invention is also employed for transferring data from the packet data memory 610 to the external memory 460 without a need of continuously reprogramming the DMA controller 620 before each data transfer. That is, the transfer logic 615, in conjunction with the mask and load, is capable of transferring varying amounts of data from the packet data memory 610 to the external memory 460 during a downlink connection. During a downlink connection, the data is received into the buffers 635(a–n) and eventually transferred from the unmasked buffers to the external memory 460. Because the process of transferring varying amounts of data from the packet data memory 610 to the external memory 460 in a downlink connection may be accomplished in a similar manner as described above for an uplink connection, such a process is not described in detail herein.

Those skilled in the art will appreciate that the above-described embodiments with respect to the WLL network 300 may also be pertinent with respect to other communications systems 200 (see FIG. 2) as well. Furthermore, although the present invention has been described with reference to communications systems 200, 300, the application of the present invention is not limited as such. It is contemplated that the application of the present invention may be extended to other technologies as well, including but not limited to, data processing systems and other electronic devices where quick access to information is desirable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
defining a first portion of a memory for receiving data;
providing a memory request to transfer data from a source to the first portion of the memory defined to receive the data; and
transferring a portion of data from the source to the first portion of the memory according to a priority scheme that determines the sequence of the data transfer, wherein the size of the portion of the data substantially corresponds to the size of the first portion of the memory.

2. The method of claim 1, wherein defining the first portion of the memory includes defining a second portion, wherein the transferring a portion of the data to the first portion of the memory includes transferring a portion of data to the second portion, wherein the size of the portion of the data substantially corresponds to the size of the second portion.

3. The method of claim 2, further including extracting the data from the first portion of the memory.

4. The method of claim 3, wherein the memory is a dual-port memory and wherein extracting the data from the first portion occurs substantially at the same time as transferring a portion of data to the first memory.

5. The method of claim 3, further including transmitting the data stored in the first portion of the memory and receiving an acknowledgement signal in response to transmitting the data.

6. The method of claim 5, further including analyzing the acknowledgement signal received in response to transmitting the data.

7. The method of claim 6, wherein defining a second portion of a memory includes defining the second portion of the memory in response to analyzing the acknowledgement analysis, wherein the size of the second portion of the memory corresponds to the amount of data successfully transferred.

8. The method of claim 6, wherein providing the memory request includes providing the memory request in response to receiving the acknowledgement signal.

9. The method of claim 8, the first portion of the memory comprising a plurality of buffers and the second portion comprising at least a subset of the plurality of the buffers, wherein transferring the portion of the data according to the priority scheme includes transferring the data to the subset of plurality of buffers based on the order the data from the plurality of buffers is transmitted.

10. The method of claim 9, wherein transferring a portion of data from the source to the first portion of the memory includes transferring a portion of data to at least one of the plurality of buffers and substantially simultaneously determining if another buffer requires new data.

11. The method of claim 10, wherein providing the memory request to transfer data is in response to determining that at least one buffer of the plurality of butters requires new data.

12. An apparatus comprising:
   a source for providing data;
   a memory having a first portion configured to receive the data from the source;
   an access controller capable of transferring data from the source to the first portion of the memory in response to a memory request; and
   a control logic capable of:
      determining the size of the first portion of the memory; and
      providing the memory access request to the access controller to transfer a portion of the data from the source that corresponds to the size of the first portion of the memory in accordance with a priority scheme that determines the sequence of the data transfer.

13. The apparatus of claim 12, wherein the first portion of the memory includes a second portion and wherein the control logic is capable of determining the size of the second portion of the memory and capable of providing the memory access request to the access controller to transfer a portion of the data from the source that corresponds to the size of the second portion of the memory.

14. The apparatus of claim 13, wherein the control logic is further capable of transmitting the data stored in the first portion of the memory and receiving an acknowledgement signal in response to transmitting the data.

15. The apparatus of claim 14, wherein the control logic is further capable of analyzing the acknowledgement signal received in response to transmitting the data.

16. The apparatus of claim 15, wherein the first portion of the memory comprising a plurality of buffers and the second portion comprising at least a subset of the plurality of the buffers.

17. The apparatus of claim 16, wherein the control logic is capable of transferring the portion of the data according to the priority scheme includes transferring the data to the subset of plurality of buffers based on the order the data from the plurality of buffers is transmitted.

18. The apparatus of claim 16, wherein the control logic is capable of transferring a portion of data from the source at least one of the plurality of buffers while substantially simultaneously determining if another buffer requires new data.

19. The apparatus of claim 18, wherein the control logic is capable of providing the memory request to transfer data is in response to determining that at least one buffer of the plurality of buffers requires new data.

20. An apparatus for transmitting and receiving data in a frame having a plurality of time slots, comprising:
   a source having data stored therein;
   a plurality of buffers;
   a controller communicatively coupled to the plurality of buffers and capable of:
      transmitting data stored in the plurality of buffers to a remote device, wherein the data in each of the buffers is transmitted in a corresponding plurality of time slot of the frame;
      receiving an acknowledgement from the remote device in a selected time slot of the frame;
      determining which of the buffers are available to receive data based on the received acknowledgement; and
      providing a portion of the data from the source to the available buffers, beginning with the first available buffer following the buffer corresponding to the selected time slot carrying the acknowledgement.

21. The apparatus of claim 20, wherein the controller capable of determining which of the buffers are available to receive data based on the received acknowledgement comprises the controller capable of determining if the data transmitted in the time slots corresponding to each of the buffers was correctly received by the remote device.

22. The apparatus of claim 20, wherein the controller is further capable of determining if the data transmitted in the time slots corresponding to each of the buffers was not correctly received by the remote device for a selected number of transmission attempts.

* * * * *